United States Patent
Goodwin, III

(10) Patent No.: US 6,705,519 B1
(45) Date of Patent: Mar. 16, 2004

(54) SYSTEM AND METHOD OF PROVIDING A REQUESTED SERVICE AT A LODGING ESTABLISHMENT

(75) Inventor: John C. Goodwin, III, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 90 days.

(21) Appl. No.: 10/101,585

(22) Filed: Mar. 20, 2002

(51) Int. Cl.[7] ................................................ G08F 7/08
(52) U.S. Cl. ........................ 235/381; 235/380; 235/379; 235/383; 705/5
(58) Field of Search ................................ 235/381, 383, 235/380, 379, 375, 382, 382.5; 705/5

(56) References Cited

U.S. PATENT DOCUMENTS

| | | | | |
|---|---|---|---|---|
| 4,752,876 A | * | 6/1988 | Couch et al. ................ 705/5 |
| 5,614,703 A | * | 3/1997 | Martin et al. ................ 235/382 |
| 5,732,398 A | * | 3/1998 | Tagawa ........................ 705/5 |
| 5,748,908 A | * | 5/1998 | Yu .............................. 705/44 |
| 6,101,477 A | * | 8/2000 | Hohle et al. ................ 705/1 |
| 6,473,500 B1 | * | 10/2002 | Risafi et al. ........... 379/144.01 |
| 6,505,772 B1 | * | 1/2003 | Mollett et al. .............. 235/379 |

* cited by examiner

Primary Examiner—Michael G. Lee
Assistant Examiner—Ahshik Kim
(74) Attorney, Agent, or Firm—Paul W. Martin; Priest & Goldstein, PLLC

(57) ABSTRACT

A system and method of providing a requested service at a lodging establishment which relies on personal identification numbers (PINS) and corresponding travel cards. The system includes a travel card reader, and a computer for recording a request of a traveler, for reading a travel card of the traveler, for establishing an assigned personal identification number (PIN), for comparing the assigned PIN to an entered PIN, and for performing the request if the entered PIN equals the assigned PIN.

10 Claims, 3 Drawing Sheets

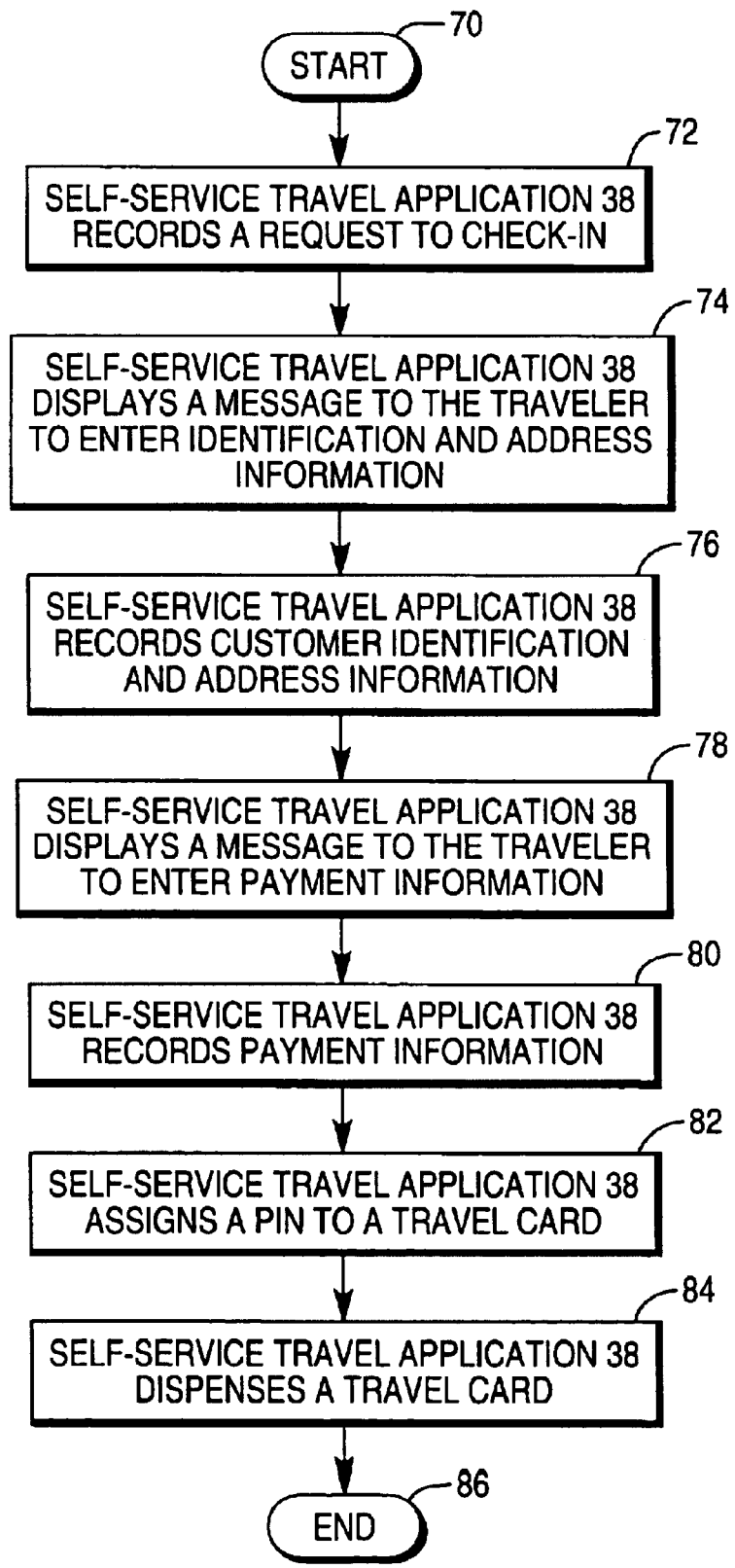

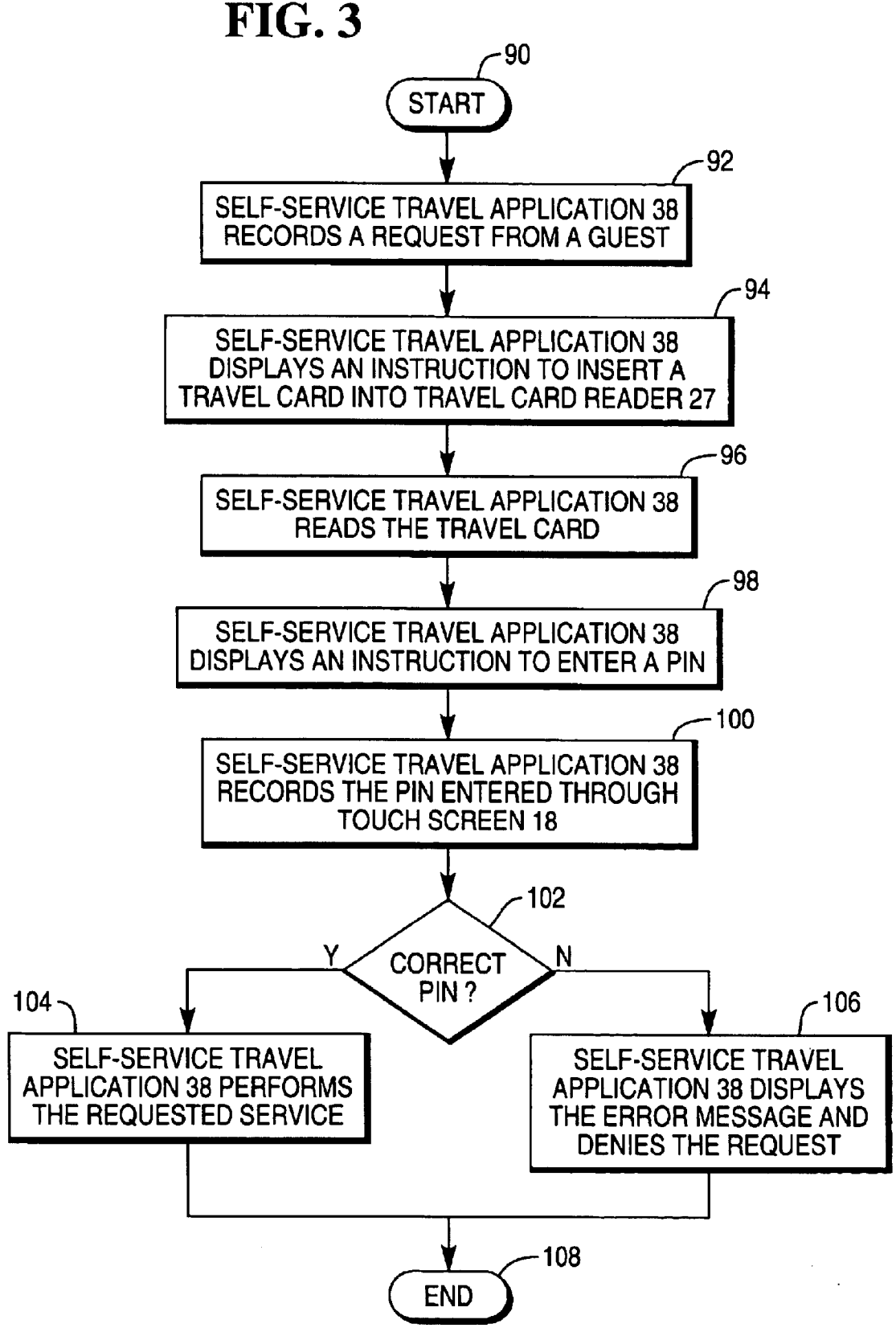

SYSTEM AND METHOD OF PROVIDING A REQUESTED SERVICE AT A LODGING ESTABLISHMENT

BACKGROUND OF THE INVENTION

The present invention relates to self-service terminals and more specifically to a system and method of providing a requested service at a lodging establishment.

Kiosks provide a publicly accessible computing platform for displaying World Wide Web (web) pages and other web-delivered content from web sites. Kiosks may be located within a retailer's transaction establishment or elsewhere, such as in shopping malls. Kiosks may be easily networked to web sites using the TCP/IP protocol. Web pages from web sites may be displayed using known and available web software, such as Microsoft® Internet Explorer software.

There is a need in the travel and entertainment industry to allow customers to check-in to a lodging establishment and to find and book entertainment activities. Therefore, it would be desirable to provide a system and method of providing a requested service at a lodging establishment.

SUMMARY OF THE INVENTION

In accordance with the teachings of the present invention, a system and method of providing a requested service at a lodging establishment is provided.

The system includes a travel card reader, and a computer for recording a request of a traveler, for reading a travel card of the traveler, for establishing an assigned personal identification number (PIN), for comparing the assigned PIN to an entered PIN, and for performing the request if the entered PIN equals the assigned PIN.

It is accordingly an object of the present invention to provide a system and method of providing a requested service at a lodging establishment.

It is another object of the present invention to provide a travel kiosk for providing services at a lodging establishment.

It is another object of the present invention to provide a check-in method at a lodging establishment.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram illustrating a first operation of the travel system; and FIG. 3 is a flow diagram illustrating a second operation of the travel system.

DETAILED DESCRIPTION OF THE PREFERRED EMBODIMENT

Figure 1:
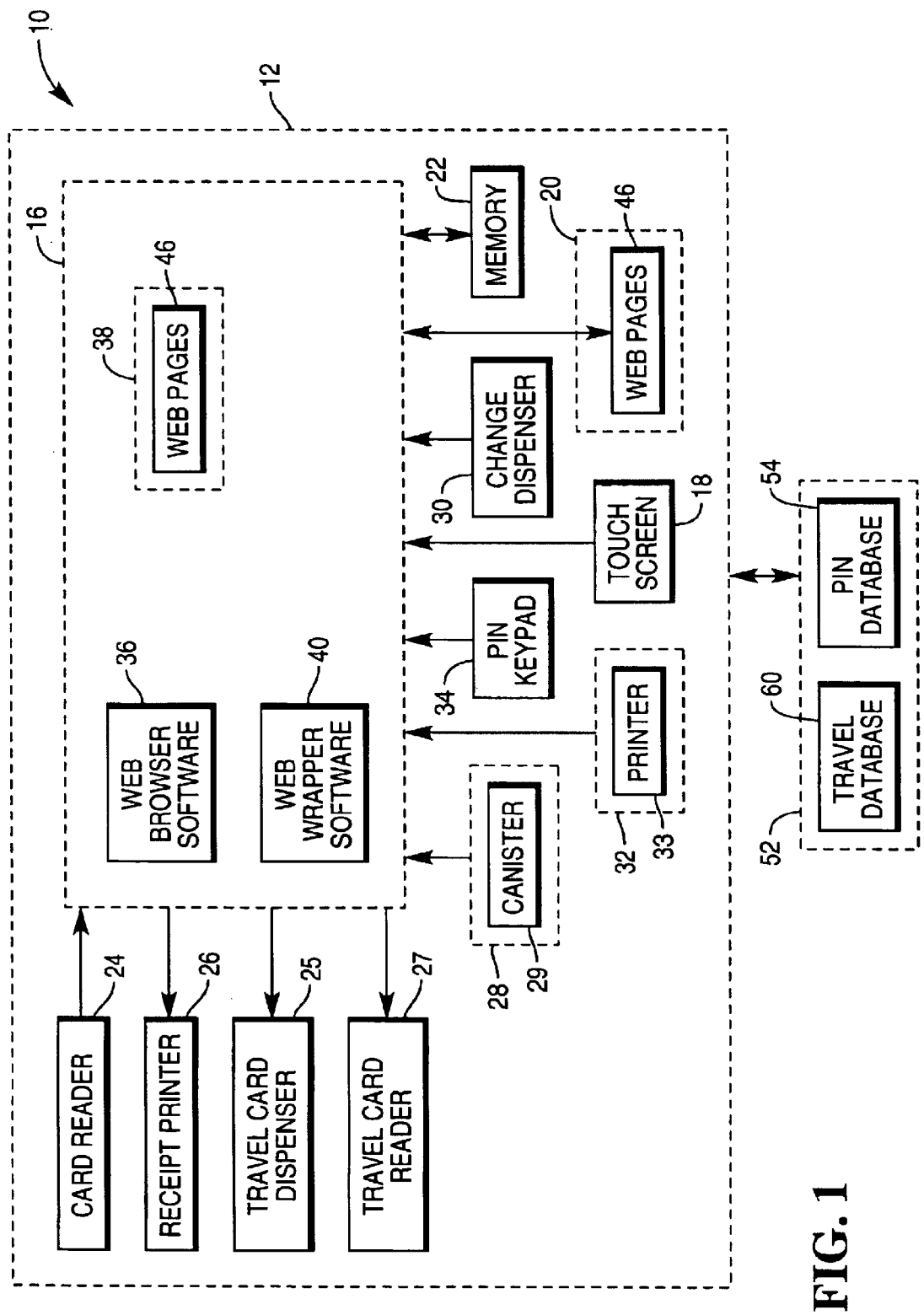
FIG. 1 is a block diagram of a travel system.

Turning now to FIG. 1, travel system 10 includes travel kiosk 12, which is a self-service terminal and which is preferably located at a resort or other lodging establishments, such as a hotel or cruise ship. Kiosk 12 may include an NCR 7401 computer.

Kiosk 12 primarily includes processor 16, touch screen 18, memory 22, and storage medium 20. Kiosk 12 may be simple and additionally include only card reader 24, receipt printer 26, travel card dispenser 25, and travel card reader 27. Card reader 24, travel card dispenser 25, and travel card reader 27 may be combined into a single unit.

Processor 16 executes self-service travel application 38, which processes travel-related requests from guests. For example, self-service travel application 38 provides access to entertainment, dining, shopping, and check-in and check-out services.

During check-in, a traveler swipes a credit card through card reader 24. Self-service travel application 38 dispenses a travel card from travel card dispenser 25. The travel card is both a room key and payment card while the traveler stays as a guest in the lodging establishment. Self-service travel application 38 allows a guest to select a personal identification number (PIN). Self-service travel application 38 may alternatively assign a PIN automatically at check-in. The PIN may be used to purchase goods and services while staying at the lodging establishment.

To purchase goods and services, a guest inserts a travel card into travel card reader 27. Self-service travel application 38 adds purchases made with the travel card to the lodging bill of the guest, which is stored in travel database 60. When the guest checks out using kiosk 12, self-service travel application 38 charges final payment for lodging and goods and services purchased with the travel card to the credit card swiped at check-in.

Application 38 communicates with server 52 over a network connection, such as one which uses the TCP/IP protocol. Application 38 stores guest and PIN information in PIN database 54.

Processor 16 may also execute web browser software 36 and web wrapper software 40.

Web browser software 36 allows a guest to display information in a format established by the World Wide Web (WWW or "web"). Application 38 may be written as a web application which displays travel information in the form of web pages 46, although application 38 may also be a non-web application and operate without web browser software 36 and web wrapper software 40. Web pages 46 may be written using hypertext markup language (HTML) or other suitable web page language.

Web browser software 36 may include commercially available web browser software, such as Microsoft® Internet Explorer web browser software. Microsoft® Internet Explorer web browser software is configured into a kiosk operation using a "-k" command line option. This option hides toolbars and menu bars to prevent guest access to those functions.

Web browser software 36 may also display a start or "home" page within web pages 46 which operates as a default page from which kiosk operation begins and to which operation returns when a guest is finished using kiosk 12.

Web wrapper software 40 provides security functions. During operation, web wrapper software 40 prevents an operator from accessing kiosk files, or other applications, or the operating system software, or basic input-output system (BIOS) firmware, and prevents the operator from causing kiosk 12 to reboot.

Touch screen 18 records guest selections and displays information to guests.

Storage medium 20 stores web pages 46 for use by application 38.

Memory 22 stores executed program information.

Card reader 24 reads credit, debit, SMART, and/or other types of payment or identification cards carried by a passenger. Card reader 24 may record payment information from a guest.

Printer 26 prints receipt information for purchased goods and services.

Travel card dispenser 25 dispenses travel cards.

Travel card reader 27 reads travel cards.

Kiosk 12 may include a number of other peripherals to enhance payment and check-in options, including cash acceptor 28, cash dispenser 30, check reader 32, and personal identification number (PIN) keypad 34.

Cash acceptor 28 includes currency storage canister 29. Cash acceptor 28 takes in currency, validates the currency, sends tendered amount information to application 38, and sends currency count information to application 38. Cash acceptor 28 may include a cash acceptor manufactured by CashCode or Mars.

Cash dispenser 30 dispenses any change due.

Check reader 32 reads checks and includes a magnetic ink character (MICR) reader. Check reader 32 also includes printer 33 for printing information on checks.

PIN keypad 34 records PIN numbers for debit card transactions.

Server 52 is preferably not within travel system 10 in order to avoid major changes to each and every travel system 10 in existence. A standalone server can easily be linked to travel system 10.

Server 52 stores PIN database 54. Server 52 also stores travel database 60, which contains information about guests, reservations, and travel card purchases.

Turning now to FIG. 2, operation of self-service travel application 38 is illustrated in detail beginning with START 70.

In step 72, self-service travel application 38 records a request to check-in from a traveler through touch screen 18.

Self-service travel application 38 takes the customer through the check-in process in steps 74–86.

In step 74, self-service travel application 38 displays a message to the traveler to enter identification and address information.

In step 76, self-service travel application 38 records customer identification and address information through touch screen 18.

In step 78, self-service travel application 38 displays a message to the traveler to enter payment information using card reader 24.

In step 80, self-service travel application 38 records payment information through card reader 24.

In step 82, self-service travel application 38 assigns a PIN to a travel card. Self-service travel application 38 may assign the PIN automatically, or request a PIN from the traveler.

In step 84, self-service travel application 38 dispenses a travel card through travel card dispenser 25 and the traveler is now a guest at the lodging establishment.

Operation ends at step 86.

Following check-in, the guest may search for restaurants, entertainment locations, or make additional reservations. Application 38 performs requested searches and displays search results. The guest may also purchase items on-line.

With reference to FIG. 3, operation of self-service travel application 38 is further illustrated in detail beginning with START 90.

In step 92, self-service travel application 38 records a request from a guest through touch screen 18. The request may include a request to purchase an item or a service or to use self-service travel terminal to search for dining or entertainment.

In step 94, self-service travel application 38 displays an instruction to insert a travel card into travel card reader 27.

In step 96, self-service travel application 38 reads the travel card.

In step 98, self-service travel application 38 displays an instruction to enter a PIN.

In step 100, self-service travel application 38 records the PIN entered through touch screen 18 or PIN pad 34.

In step 102, self-service travel application 38 determines whether the PIN is correct by comparing it to a corresponding PIN in PIN database 52. If the PIN is correct, operation proceeds to step 104. Otherwise, operation proceeds to step 106.

In step 104, self-service travel application 38 performs the requested service. If the service is a purchase, self-service travel application 38 charges the purchase price to the account of the guest in travel database 60 and orders the item or service. If the service involves a search for dining or entertainment, self-service travel application 38 performs the requested search. Operation proceeds to step 108.

In step 106, self-service travel application 38 displays and error message and denies the request. Self-service travel application 38 may prompt the guest several times to enter the correct PIN before terminating.

Operation ends in 108.

Although the present invention has been described with particular reference to certain preferred embodiments thereof, variations and modifications of the present invention can be effected within the spirit and scope of the following claims.

What is claimed is:

1. A self-service transaction method comprising the steps of:
   (a) establishing a personal identification number (PIN) assigned by a self-service terminal, to a traveler at a lodging establishment, the PIN being established through self-service operation of the terminal by the traveler without a need for intervention by an employee of the lodging establishment;
   (b) recording a request of the traveler; and
   (c) performing the request by the self-service terminal if the self-service terminal records entry of a PIN equal to the assigned PIN.

2. A self-service transaction method comprising the steps of:
   (a) establishing a personal identification number (PIN) assigned by a self-service terminal, to a traveler at a lodging establishment, the PIN being established through self-service operation of the terminal by the guest without a need for intervention by an employee of the lodging establishment;
   (b) recording a request of a traveler at a lodging establishment by a self-service terminal;
   (c) if the traveler is a recorded guest of the lodging establishment, performing the request by the self-service terminal if the self-service terminal records entry of a PIN equal to the assigned PIN; and
   (d) if the traveler is checking in, issuing the assigned PIN and a corresponding travel card to the traveler.

3. The system of claim 2, wherein step (b) comprises the substep of
  (b-1) assigning the PIN automatically by the self-service terminal.

4. The system of claim 2, wherein step (b) comprises the substep of
  (b-1) recording the PIN from traveler entry by the self-service terminal.

5. A self-service transaction method comprising the steps of:
  (a) recording a purchase request by a self-service terminal at a lodging establishment;
  (b) reading a travel card by the self-service terminal, the travel card having being previously assigned by self-service operation of a self-service terminal without a need for intervention by an employee of the lodging establishment;
  (c) recording a personal identification number (PIN) by the self-service terminal, the PIN having being previously assigned by self-service operation of a self-service terminal without a need for intervention by an employee of the lodging establishment;
  (d) comparing the PIN to a corresponding reference PIN in a PIN database by the self-service terminal; and
  (e) charging a price of the purchase request to a guest account associated with the travel card if the PIN equals the reference PIN.

6. A self-service transaction method comprising the steps of:
  (a) recording a search request by a self-service terminal at a lodging establishment;
  (b) reading a travel card by the self-service terminal, the travel card having being previously assigned by self-service operation of a self-service terminal without a need for intervention by an employee of the lodging establishment;
  (c) recording a personal identification number (PIN) by the self-service terminal, the PIN having being previously assigned by self-service operation of a self-service terminal and added to a PIN database without a need for intervention by an employee of the lodging establishment;
  (d) comparing the PIN to a corresponding reference PIN in a the PIN database by the self-service terminal; and
  (e) performing a search if the PIN equals the reference PIN.

7. A self-service transaction method comprising the step of providing a self-service terminal capable of establishing a personal identification number (PIN) assigned to a traveler at a lodging establishment, the PIN being assigned through a self-service operation of the terminal by the traveler without a need for intervention by an employee of the lodging establishment; and
  performing the request by the self service terminal if the self-service terminal records entry of a PIN equal to the self-service PIN.

8. A system for a lodging establishment, comprising: a travel card reader; and
  a computer for recording a request of a traveler, for reading a travel card of the traveler, for establishing an assigned personal identification number (PIN) for the traveler through self-service operation of the system by the traveler without a need for intervention by an employee of the lodging establishment, for comparing the assigned PIN to the entered PIN, and for performing the request if the entered PIN equals the assigned PIN.

9. A system for a lodging establishment, comprising:
  a travel card reader;
  a travel card dispenser;
  a payment card reader; and
  a computer for recording a request of a traveler, for establishing an assigned personal identification number (PIN) for a traveler, the PIN being established through self-service operation of the system by the traveler without a need for intervention by an employee of the lodging establishment, and, if the traveler is a recorded guest of the lodging establishment, for reading a travel card through the travel card reader and for performing the request if the self-service terminal records entry of a PIN equal to the assigned PIN.

10. A self-service transaction method comprising the steps of:
  (a) establishing a personal identification number (PIN) assigned by a self-service terminal, to a traveler at a lodging establishment, the PIN being established through self-service operation of the terminal by the traveler without a need for intervention by an employee of the lodging establishment;
  (b) recording a request of the traveler;
  (c) determining if a PIN entered by the traveler is the correct PIN assigned for the traveler; and
  (d) performing the request by the self-service terminal if the PIN entered by the traveler in the self-service terminal is the correct PIN.

\* \* \* \* \*

UNITED STATES PATENT AND TRADEMARK OFFICE
CERTIFICATE OF CORRECTION

PATENT NO. : 6,705,519 B1
DATED : March 16, 2004
INVENTOR(S) : Goodwin, J. C., III It is certified that error appears in the above-identified patent and that said Letters Patent is hereby corrected as shown below:

Column 5,
Line 44, after "in" delete "a".

Signed and Sealed this

Eighth Day of March, 2005

JON W. DUDAS
*Director of the United States Patent and Trademark Office*